Patented Mar. 20, 1923.

1,449,135

UNITED STATES PATENT OFFICE.

ALFRED WOHL, OF DANZIG-LANGFUHR, FREE CITY OF DANZIG, ASSIGNOR TO THE FLEISCHMANN COMPANY, OF NEW YORK, N. Y., A CORPORATION OF OHIO.

METHOD OF WASHING COMPRESSED YEAST.

No Drawing. Original application filed June 23, 1920, Serial No. 391,156. Divided and this application filed August 31, 1921. Serial No. 497,324.

*To all whom it may concern:*

Be it known that I, ALFRED WOHL, residing at Danzig-Langfuhr, of the free city of Danzig, have invented certain new and useful Improvements in Methods of Washing Compressed Yeast, of which the following is a specification.

If in the manufacture of yeast, molasses is employed wholly or in part, then in separating the yeast formed from the liquid in the ordinary pressing process, a portion of the liquor remains behind associated with the yeast, which deepens the colour and causes it to grow still darker when kept for a time. Furthermore, the poor keeping properties of yeast derived from molasses, especially in summer are to be attributed essentially to this incomplete separation of the liquor. The process of separation by repeated decanting is one which occupies a great deal of time and entails losses of yeast. The removal of the occluded liquor by washing in a filter press is well known to be difficult because the compressed yeast is found hard to wash by the ordinary method of separation in the filter press.

This difficulty can be removed if the following course is adopted in accordance with the present invention:—A sufficient stock of of yeast is produced which is preliminarily purified by repeated washing with water, decanting and pressing. Then, in the regular course of operations, a filter press is employed which is only pumped partially full to such an extent that washing is possible without great resistance either in the ordinary or the dulcifying press. This can only be the case when the pasty yeast in the chambers is of less consistency than is afterwards necessary for the emptying of the press and the cutting up of the yeast if a well pressed yeast is to be obtained. The yeast partially filling the press is then washed. As soon as the washing is completed however pure yeast is then pumped in from the stock until the usual and necessary degree of filling for satisfactory pressing is reached in the press. A portion of the pure yeast thus obtained can then be kept back afterwards in permanent operations, stirred up in water and always kept ready for forcing back into the washing presses to fill them after washing of successive batches of yeast therein which partially fill the presses.

The method of my present invention may be applied with advantage (especially for improvement of the keeping quality of the yeast) in the washing of yeast produced with other nutrients, as well as with those in which molasses is used.

This application is a division of my copending application for United States Patent Serial No. 391,156, filed June 23, 1920.

What I claim is:—

1. In the method of washing and pressing yeast in a filter press, the improvement which comprises the steps of partially filling a filter press with yeast carrying with it associated impurities removable by washing, washing the yeast in the partially filled press, thereafter further filling the press with previously purified yeast and completing the pressing of the yeast within the press.

2. In the method of washing and pressing yeast in a filter press, the improvement which comprises the steps of partially filling a filter press with yeast carrying with it associated impurities removable by washing, washing the yeast in the partially filled press, thereafter further filling the press with yeast purified by previous washing and completing the pressing of the yeast within the press.

3. In the method of washing and pressing yeast in a filter press, the improvement which comprises the steps of partially filling a filter press with yeast carrying with it a residuum of associated residual liquid from a nutrient in which the yeast was grown, washing the yeast in the partially filled press, thereafter further filling the press with previously purified yeast and completing the pressing of the yeast within the press.

4. In the method of washing and pressing yeast in a filter press, the improvement which comprises the steps of partially filling a filter press with yeast carrying with it a residuum of associated residual liquid from a molasses-containing nutrient in which the yeast was grown, washing the yeast in the partially filled press, thereafter further filling the press with previously purified yeast and completing the pressing of the yeast within the press.

5. In the method of washing and pressing yeast in a filter press, the improvement which comprises the steps of partially filling a filter press with yeast carrying with it a residuum of associated residual liquid from a nutrient in which the yeast was grown, washing the yeast in the partially filled press, thereafter further filling the press with previously washed yeast and completing the pressing of the yeast within the press.

6. In the method of washing and pressing yeast in a filter press, the improvement which comprises the steps of partially filling a filter press with yeast carrying with it a residuum of associated residual liquid from a molasses-containing nutrient in which the yeast was grown, washing the yeast in the partially filled press, thereafter further filling the press with previously washed yeast and completing the pressing of the yeast within the press.

7. In the method of washing and pressing yeast in a filter press, the improvement which comprises the steps of partially filling a filter press with yeast carrying with it a residuum of associated residual liquid from a nutrient in which the yeast was grown, washing the yeast in the partially filled press, thereafter further filling the press with previously washed yeast, obtained from a previous washing and pressing in successive stages, and completing the pressing of the yeast within the press.

8. In the method of washing and pressing yeast in a filter press, the improvement which comprises the steps of partially filling a filter press with yeast carrying with it a residium of associated residual liquid from a molasses-containing nutrient in which the yeast was grown, washing the yeast in the partially filled press, thereafter further filling the press with previously washed yeast, obtained from a previous washing and pressing in successive stages, and completing the pressing of the yeast within the press.

In testimony whereof I affix my signature in presence of two witnesses.

ALFRED WOHL.

Witnesses:
HOWARD A. BOWMAN,
WILLIAM M. ROBERTSON.